(12) United States Patent
Schramm et al.

(10) Patent No.: US 8,833,331 B2
(45) Date of Patent: Sep. 16, 2014

(54) REPAIRED ENGINE BLOCK AND REPAIR METHOD

(71) Applicant: Ford Global Technologies, LLC, Dearborn, MI (US)

(72) Inventors: Leander Schramm, Remda-Teichel OT Teichroeda (DE); Ralph W. K. Wilton, Haverhill (GB); Barry Griffiths, Billericay (GB); Clemens Maria Verpoort, Monheim (DE); Wolfgang Puetz, Cologne (DE); Mark Robert Silk, Pulheim (DE); David Harknett, Rochford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/752,572

(22) Filed: Jan. 29, 2013

(65) Prior Publication Data

US 2013/0199490 A1 Aug. 8, 2013

(30) Foreign Application Priority Data

Feb. 2, 2012 (DE) .......................... 10 2012 201 483

(51) Int. Cl.
*F02B 75/22* (2006.01)
*B23P 6/02* (2006.01)
*F02F 7/00* (2006.01)
*F02F 1/00* (2006.01)

(52) U.S. Cl.
CPC ................. *B23P 6/02* (2013.01); *F02F 7/0021* (2013.01); *F02F 1/004* (2013.01)

USPC ..................................................... 123/195 R

(58) Field of Classification Search
CPC ....... F01M 11/02; F02F 7/0053; F02F 7/0007; F02F 7/0012; F02B 2075/025; F05C 2201/021
USPC ..................................................... 123/195 R
See application file for complete search history.

(56) References Cited

U.S. PATENT DOCUMENTS

| 3,031,330 A | 4/1962 | Hornick et al. |
| 3,114,960 A | 12/1963 | Einaudi |

(Continued)

FOREIGN PATENT DOCUMENTS

| DE | 4411296 A1 | 7/1995 |
| DE | 19508687 | 10/1995 |

(Continued)

OTHER PUBLICATIONS

C. Werporrt, W. Blume, R. Ehrenpreis, Ford Motor Company, ICES-2006-1391, Proceedings of ICes2006, Therma Spraying of Aluminum Cylinder Bores by the Ford PTWA Spray Process, 2006 Internal Combustion Engine Division Spring Technical Conference May 7-10, 2006, Aachen, Germany.

(Continued)

*Primary Examiner* — Lindsay Low
*Assistant Examiner* — Charles Brauch
(74) *Attorney, Agent, or Firm* — Damian Porcari; Brooks Kushman P.C.

(57) ABSTRACT

A block for an internal combustion engine having at least one coated cylinder bore, which has a chamfer at a sealing surface with respect to a cylinder head, wherein the chamfer is a curved chamfer.

8 Claims, 1 Drawing Sheet

(56) References Cited

U.S. PATENT DOCUMENTS

| | | |
|---|---|---|
| 3,324,496 A | 6/1967 | Haracz |
| 3,833,321 A | 9/1974 | Telang et al. |
| 4,324,017 A | 4/1982 | Viehe |
| 4,646,479 A | 3/1987 | Walker et al. |
| 5,050,547 A | 9/1991 | Takahashi |
| 5,107,967 A | 4/1992 | Fujita et al. |
| 5,194,304 A | 3/1993 | McCune, Jr. et al. |
| 5,212,738 A | 5/1993 | Chande et al. |
| 5,239,955 A | 8/1993 | Rao et al. |
| 5,332,422 A | 7/1994 | Rao |
| 5,363,821 A | 11/1994 | Rao et al. |
| 5,380,564 A | 1/1995 | VanKuiken, Jr. et al. |
| 5,466,906 A | 11/1995 | McCune et al. |
| 5,480,497 A | 1/1996 | Zaluzec et al. |
| 5,481,084 A | 1/1996 | Patrick et al. |
| 5,622,753 A | 4/1997 | Shepley et al. |
| 5,648,122 A | 7/1997 | Rao et al. |
| 5,691,004 A | 11/1997 | Palazzolo et al. |
| 5,820,938 A | 10/1998 | Pank et al. |
| 5,922,412 A | 7/1999 | Baughman et al. |
| 5,931,038 A | 8/1999 | Higashi |
| 5,958,520 A | 9/1999 | Cook et al. |
| 5,958,521 A | 9/1999 | Zaluzec et al. |
| 5,997,286 A | 12/1999 | Hemsath et al. |
| 6,328,026 B1 | 12/2001 | Wang et al. |
| 6,395,090 B1 | 5/2002 | Shepley et al. |
| 6,441,619 B1 | 8/2002 | Araki et al. |
| 6,589,605 B2 | 7/2003 | Shepley et al. |
| 6,622,685 B2 | 9/2003 | Takahashi et al. |
| 6,856,866 B2 | 2/2005 | Nakao |
| 6,863,931 B2 | 3/2005 | Someno et al. |
| 6,914,210 B2 | 7/2005 | Grossklaus, Jr. et al. |
| 7,089,662 B2 | 8/2006 | Izquierdo et al. |
| 7,165,430 B2 | 1/2007 | Weidmer |
| 7,172,787 B2 | 2/2007 | Torigoe et al. |
| 7,188,416 B1 | 3/2007 | Woehlke et al. |
| 7,415,958 B2 | 8/2008 | Boehm et al. |
| 7,533,657 B2 | 5/2009 | Onodera |
| 7,568,273 B2 | 8/2009 | Lizumi et al. |
| 7,607,209 B2 | 10/2009 | Iizumi et al. |
| 7,758,910 B2 | 7/2010 | Moreau et al. |
| 7,851,046 B2 | 12/2010 | Nishimura et al. |
| 7,862,404 B2 | 1/2011 | Takashima et al. |
| 7,982,435 B2 | 7/2011 | Masuda |
| 8,103,485 B2 | 1/2012 | Plett |
| 8,209,831 B2 | 7/2012 | Boehm et al. |
| 2003/0052650 A1 | 3/2003 | Gunji |
| 2004/0065290 A1* | 4/2004 | Wakade et al. ............ 123/193.2 |
| 2004/0079556 A1 | 4/2004 | Cramer et al. |
| 2005/0064146 A1 | 3/2005 | Hollis et al. |
| 2005/0137829 A1 | 6/2005 | Gimelfarb et al. |
| 2006/0021809 A1 | 2/2006 | Xu et al. |
| 2006/0100833 A1 | 5/2006 | Plett |
| 2007/0000129 A1* | 1/2007 | Hahn et al. ............... 29/888.011 |
| 2007/0012177 A1 | 1/2007 | Miyamoto et al. |
| 2008/0244891 A1 | 10/2008 | Iizumi et al. |
| 2008/0245226 A1 | 10/2008 | Iizumi et al. |
| 2008/0252412 A1 | 10/2008 | Larsson et al. |
| 2008/0260958 A1 | 10/2008 | Sekikawa et al. |
| 2009/0031564 A1 | 2/2009 | Meier |
| 2009/0058366 A1 | 3/2009 | Masuda |
| 2009/0175571 A1 | 7/2009 | Boehm et al. |
| 2010/0031799 A1 | 2/2010 | Ast et al. |
| 2010/0101526 A1 | 4/2010 | Schaefer |
| 2010/0139607 A1 | 6/2010 | Herbst-Dederichs et al. |
| 2011/0000085 A1 | 1/2011 | Kanai et al. |
| 2011/0023777 A1 | 2/2011 | Nishimura et al. |
| 2011/0030663 A1 | 2/2011 | Verpoort et al. |
| 2011/0297118 A1 | 12/2011 | Izawa et al. |
| 2012/0018407 A1 | 1/2012 | Schramm et al. |

FOREIGN PATENT DOCUMENTS

| | | |
|---|---|---|
| DE | 4447514 A1 | 2/1996 |
| DE | 19919024 A1 | 11/2000 |
| DE | 102005055984 A1 | 5/2007 |
| DE | 60131096 T2 | 2/2008 |
| DE | 102006045275 B3 | 2/2008 |
| DE | 102006057641 A1 | 6/2008 |
| DE | 102008022225 A1 | 11/2009 |
| DE | 102008024313 A1 | 12/2009 |
| DE | 102008058452 A1 | 2/2010 |
| DE | 102009008741 A1 | 8/2010 |
| DE | 102010014689 | 10/2011 |
| EP | 0716158 | 6/1996 |
| EP | 0903422 | 3/1999 |
| EP | 0919715 A2 | 6/1999 |
| EP | 0816527 B1 | 7/2000 |
| EP | 1408134 A1 | 4/2004 |
| EP | 1416063 A1 | 5/2004 |
| EP | 1504833 A1 | 2/2005 |
| EP | 1559807 | 8/2005 |
| EP | 1854903 A1 | 11/2007 |
| EP | 1967601 A2 | 9/2008 |
| JP | 1-246352 | 10/1989 |
| JP | 1-246352 A | 10/1989 |
| JP | 08111582 A | 4/1996 |
| JP | 2001245457 | 9/2001 |
| JP | 2005336556 A | 12/2005 |
| JP | 2006097045 A | 4/2006 |
| JP | 2006097046 A | 4/2006 |
| JP | 2007277607 A | 10/2007 |
| JP | 2010209454 | 9/2010 |
| JP | 2010275898 | 12/2010 |
| JP | 2010275898 A | 12/2010 |
| RU | 2297314 C2 | 4/2007 |
| SU | 1310181 A1 | 5/1987 |
| WO | 0037789 A1 | 6/2000 |
| WO | 2005040446 A1 | 5/2005 |
| WO | 2005040446 A1 | 6/2005 |
| WO | 2005273425 | 8/2005 |
| WO | 2006061710 A1 | 6/2006 |
| WO | 2007007821 A1 | 1/2007 |
| WO | 2007087989 A1 | 8/2007 |
| WO | 2008034419 A1 | 3/2008 |
| WO | 2010015229 | 2/2010 |
| WO | 2011161346 | 12/2011 |

OTHER PUBLICATIONS

Eberhard Kretzschmar, The Metal Spraying Process and its Application in our history, Veb Carl Marhold Publishing House, Halle (Salle), 1953.

German Patent and Trademark Office, German Search Report for the corresponding German Patent Application No. DE 10 2009 027 200.3-45 mailed Mar. 8, 2010.

Verpoort, et al. Thermal Spraying of Aluminum Cylinder Bores by the Ford PTWA Spray Process, ICES2006-1391, Proceedings of ICES2006, 2006 Internal Combustion Engine Division Spring Technical Conference, May 7-10, 2006, Aachen, Germany.

The Metal Spraying Process and its Application in our Industry, by Eberhard Kretzschmar, Veb Carl Marhold Publishing House, Halle (Salle), 1953.

German Patent and Trademark Office, Search Report for the corresponding German Patent Application No. 10 2009 027 200.3-45 mailed Mar. 8, 2010.

International Patent Bureau, International Search Report for the corresponding German Patent Application No. DE 10 2008 019 933.8 filed Apr. 21, 2008 and the PCT/EP2009/054670 filed Apr. 20, 2009.

European Patent Office, European Search Report for the corresponding EP Application No. 10167055.2 mailed Oct. 11, 2011.

German Patent & Trademark Office, German Examination Report for the corresponding German Patent Application No. 10 2013 200 912.7 dated Aug. 28, 2013.

(56) References Cited

OTHER PUBLICATIONS

Non-final Office Action dated Dec. 12, 2013 for U.S. Appl. No. 13/538,151, filed Jun. 29, 2012.
Non-final Office Action dated Dec. 4, 2013 for U.S. Appl. No. 13/752,572, filed Jan. 29, 2013.
Applicants' Statement of Relevance in Accordance With 37 C.F.R. 1.98(a)(3)(i) for IDS Reference JP 2001-245457.
Japanese Patent Office, Japanese Office Action for Japanese Patent Application No. 2010-139542.
European Patent Office, European Search Report for the corresponding European Patent Application No. 12192730.5-1353 mailed Feb. 21, 2013.
Peter Ernst, Gerard Barbezat, Thermal Spray Applications in Powertrain Contribute to the Savings of Energy and Material Resources, Sulzer Metco AG Switzerland, Rigackerstrasse 16, 5610 Wohlen, Switzerland.
Journal of Thermal Spray Technology, JTTEE5 16: 181-182, In The News, Conference and Workshop Information, vol. 16(2) Jun. 2007.

* cited by examiner

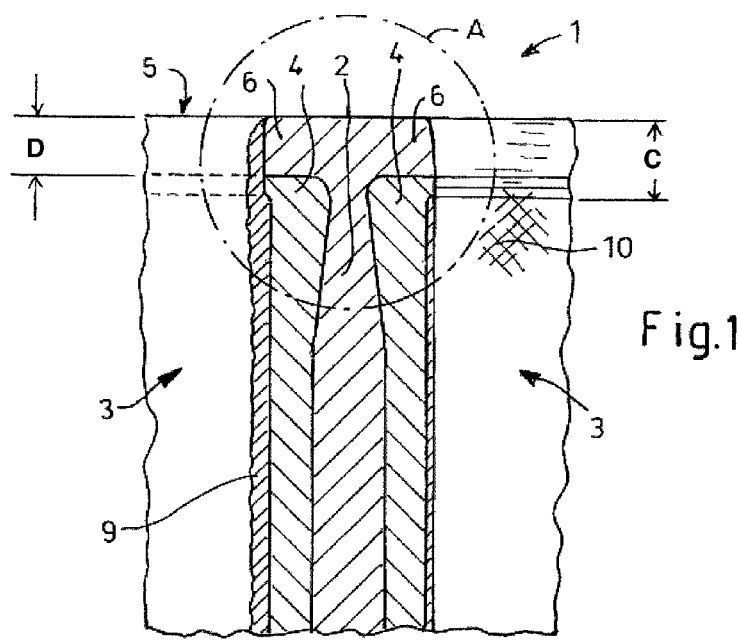
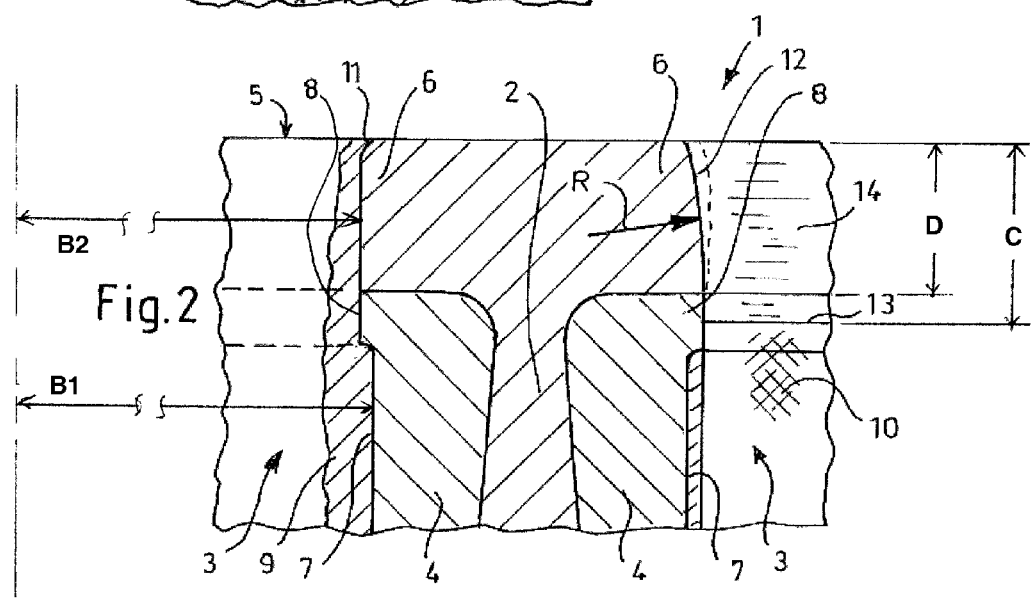

REPAIRED ENGINE BLOCK AND REPAIR METHOD

CROSS-REFERENCE TO RELATED APPLICATIONS

This application claims foreign priority benefits under 35 U.S.C. §119(a)-(d) to DE 10 2012 201 483.7, filed Feb. 2, 2012, which is hereby incorporated by reference in its entirety.

TECHNICAL FIELD

The invention relates to a block for an internal combustion engine having a coated cylinder bore, which has a chamfer at a sealing surface with respect to a cylinder head.

BACKGROUND

It is known to repair worn cylinder bores of engine blocks. If the block is composed exclusively of gray cast iron, the cylinder bore can be bored out, re-coated by thermal spraying and then finish-machined to the original dimensions.

However, if the block is composed of aluminum (or a material having similar mechanical properties), such a repair may not be readily possible. But the piston does not always run directly in the engine block material because this material may not meet higher tribological requirements and the replacement of the piston and cylinder as principal wearing components is also considerably more complex. For this reason, a cylinder liner made of a more wear resistant material is often installed in the cylinder bore of an aluminum block. In a repair, the inner surface of the liner is re-bored and super-finished by honing. Cast-iron or aluminum alloys (usually with silicon) have proven suitable as materials for cylinder liners.

Although re-coating as above is possible, there is often flaking etc. of the new material, owing, for example, to the over-spraying of the block material with the different liner material and the differing thermal properties thereof. Finish-machining of the top surface or sealing surface with respect to the cylinder head may therefore be necessary.

DE 10 2009 008 741 A1 discloses a block for an internal combustion engine having at a cylinder bore which has a double chamfer at a sealing surface with respect to a cylinder head. The double chamfer consists of first and second chamfers inclined at two different angles with respect to the cylinder bore axis. The machining of such a double chamfer is complex and expensive, as is the milling cutter used to create such a double chamfer.

SUMMARY

In an embodiment disclosed herein, an engine block is formed of a first material and defines a cylinder bore terminating at a sealing surface. The block comprises a bore liner within the cylinder bore and formed of a second material. An end of the liner is spaced from the sealing surface to leave an annular surface of the first material exposed adjacent the sealing surface. A curved chamfer is formed at a sealing surface end of the bore and extends into the annular surface and the end of the liner.

By virtue of the fact that the chamfer is a curved, single chamfer, it is possible to produce the cylinder bore chamfer in one machining operation by means of a simple tool and, at the same time, to achieve an advantageous transition between materials. An appropriately designed milling cutter, drill or boring tool can be used as a tool.

In another embodiment, a method of repairing a worn liner in an engine block cylinder bore comprises machining the liner to form an inlet surface of increased diameter, the inlet terminating a distance from a sealing surface end of the bore. A repair coating is then sprayed onto the inlet surface, and the coating is machined to a nominal bore diameter. A curved chamfer is then formed at the sealing surface end of the bore and extends into the bore to the liner.

In this method, all the sprayed material is removed from the base material between the sealing surface and the cylinder liner. This is advantageous because the sprayed material may not adhere as well to the base material as to the material of the cylinder liner. Due to instances of ovality in the cylinder bore, it may also be worthwhile for the chamfer to extend partially into the cylinder liner itself to ensure that the sprayed material is entirely removed from the base material. The curved chamfer advantageously allows the removal of the sprayed material without removing a large amount of base material from the block itself.

The curved chamfer prevents flaking of the material of the spray-on layer at the transition between the different materials of the block and of the liner, thus making it possible to repair even blocks made of aluminum or other alloys.

In particular, it may be advantageous if the chamfer forms a trumpet-shaped extension of the cylinder bore toward the sealing surface in the axial direction of the cylinder bore.

It has proven particularly advantageous here if, in the axial direction of the cylinder bore, the chamfer has a radius which is about 0.1 mm larger at the sealing surface than the original cylinder bore radius and, if appropriate, the chamfer extends from the sealing surface into the cylinder bore to a depth of from 2 to 6 mm, in particular 3.5 mm. In this case, the chamfer should have a radius of about 40 mm to 100 mm.

BRIEF DESCRIPTION OF THE DRAWINGS

Further details, features and advantages of the invention will emerge from the following description of an illustrative embodiment with reference to the drawing, in which FIG. 1 shows a longitudinal section through a web between two cylinder bores of an engine block; and FIG. 2 shows an enlarged detail of FIG. 1 in the region of the chamfer.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The figures show sections through an engine block 1 in the region of a web 2, which separates two cylinder bores 3. Here, FIG. 1 shows an overview and FIG. 2 shows the enlarged detail A from FIG. 1.

In the cylinder bores 3, the cylinder liners 4 are cast into the block 1. The cylinder liners 4 may typically be composed of steel or gray cast iron, while the base material of the block 1 may typically consist of an aluminum alloy. A sealing surface 5 with respect to a cylinder head (not shown) forms the top end of the block 1. The cylinder liners 4 do not extend to reach the sealing surface 5 but rather stop short of the surface, with the result that annular flanges 6 composed of the block material are present between the sealing surface 5 and the ends of the cylinder liners 4. Flanges 6 have a longitudinal or axial dimension indicated as D in the figures.

The block 1 shown requires repairing, such as may be necessary if the cylinder liners 4 become worn due to excessive stress. The repairing is accomplished by means of a spray repair method. To prepare the block for the spray-on repair material, the cylinder liners 4 are bored out from below (the ends of the bores that open to the crankcase, not shown) in at least the region of the worn piston bearing surfaces, thereby giving rise to a relieved portion or inlet 7 having radius B1 as indicated in FIG. 2. The un-bored projecting section 8 of the cylinder liner 4 between the annular flange 6 and the inlet 7 retains the original, smaller bore radius, indicated as B2.

The two cylinder bores 3 are shown at different stages of the repair process. The left-hand cylinder bore 3 is shown in a state immediately after the application of a spray-on layer 9. Layer 9 may be applied by any suitable metal spraying method, e.g. plasma powder spraying, plasma transferred wire arc spraying, etc. The spray-on layer 9 is applied to a thickness greater than is desired in the finished (repair-complete) state and extends beyond the inlet 7 onto the circumferential surfaces of the projecting section 8 and onto the annular flange 6. For this reason, the spray-on layer 9 must be removed to achieve the nominal dimension of the cylinder bore 3 in a further working step.

The right-hand cylinder bore 3 shows the state after the machining of the block 1 and, in particular, of the spray-on layer 9. In the region of the inlet 7, the spray-on layer 9 has been machined down to the nominal bore dimension, for example by a honing operation. The surface finish after honing is indicated by the crisscross score marks at 10.

In the region of the annular flange 6, the machining may be made more difficult by the fact that the spray-on layer 9 typically does not adhere well to the base material of the block 1. Another potential problem may be caused by any pre-existing chamfering 11 present on the block 1 as originally produced, which may have been intended to facilitate the installation of the piston into the cylinder bore. By means of the curved chamfer 12 with the radius R, the entire region of the annular flange 6 and of the sealing surface 5 can be machined in such a way that the pre-existing chamfering 11 is removed completely, and the sealing surface 5 as well as the material of the spray-on layer 9 is removed completely from the annular flange. By virtue of the curvature R of the chamfer 12, the amount of material removed from the annular flange is minimized. The amount of material removal in this area should be minimized to ensure that the dead space (un-swept internal volume) in the cylinder is not increased unnecessarily, and that the formation of dead zones for combustion and mixing in the combustion chamber is minimized in the region of the chamfer 12.

To ensure that all the material of the spray-on layer 9 is reliably removed from the annular flange when the chamfer 12 is machined, the chamfer 12 may extend downward from sealing surface 5 into the cylinder liner 4, as indicated by depth C. This depth of the chamfer 12 can be seen at the parting line 13 extending around in the cylinder bore 3, which is the boundary line where the surface structure changes from the honed structure 10 to the bored structure 14 turned or bored all the way around, with the encircling score marks (indicated by horizontal lines) in the region of the curved chamfer 12, the bored structure 14 thereby giving an indication of the extent of the chamfer 12. The depth C of chamfer 12 preferably extends no lower than an upper-most end of the piston ring bearing surface of the bore.

The chamfer 12 may flare or curve radially outward (relative the cylinder bore axis), i.e. form a trumpet-shaped extension of the cylinder bore 3 toward the sealing surface 5 in the axial direction of the cylinder bore 3.

Given the dimensions shown, the chamfer 12 begins at the parting line 13 at a depth C of about 3.5 mm in the cylinder bore 3 and runs out upward and outward, so that the radius of the chamfer is about 0.1 mm larger at the sealing surface 5 than the original cylinder bore radius at the parting line 13.

A curved chamfer may also be used on engine blocks which do not have cylinder liners. In this liner-less case, the chamfer serves to clean the region of the transition from the cylinder bore to the sealing surface and, at the same time, as an assembly aid for the insertion of a piston into the cylinder bore. The curved chamfer provides a smooth transition, making it easier to introduce a piston into the cylinder bore.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An engine block formed of a first material and having a sealing surface with respect to a cylinder head, the block defining a cylinder bore terminating axially at the sealing surface, the block comprising:
    a bore liner within the cylinder bore and formed of a second material, an axial end of the liner spaced axially from the sealing surface to leave an annular inner bore surface of the first material exposed immediately adjacent the sealing surface; and
    a curved chamfer around an inner circumference of the bore at a sealing surface end of the bore and extending into the annular inner bore surface and the end of the liner.

2. The block of claim 1, wherein the chamfer extends from the sealing surface into the cylinder bore to a depth of between approximately 2 mm and approximately 6 mm.

3. The block of claim 1, wherein the chamfer has a radius of curvature of between approximately 40 mm and approximately 100 mm.

4. The block of claim 1, wherein the first material is an aluminum alloy.

5. The block of claim 1, wherein the second material is cast iron.

6. A method of repairing a worn liner in an engine block cylinder bore, the block formed of a first material and having a sealing surface with respect to a cylinder head, and a top axial end of the liner spaced axially from the sealing surface to leave an annular inner bore surface of the first material exposed immediately adjacent the sealing surface, the method comprising:
    machining the liner from a bottom axial end of the cylinder bore opposite from the top axial end to form an inlet surface terminating an axial distance from a top axial end of the bore adjacent to the sealing surface, the inlet surface having a diameter greater than a diameter of an un-machined portion of the bore adjacent to the top axial end of the bore;
    spraying a repair coating onto the inlet surface and the annular inner bore surface;

machining the repair coating to a nominal bore diameter; and forming a curved chamfer around a circumferential edge between the sealing surface end of the bore and the sealing surface, the chamfer extending axially into the liner.

7. The method of claim 6, wherein the chamfer is formed to extend from the sealing surface into the cylinder bore to a depth of between approximately 2 mm and approximately 6 mm.

8. The method of claim 6, wherein the chamfer is formed to have a radius of curvature of between approximately 40 mm and approximately 100 mm.

* * * * *